United States Patent Office 3,219,610
Patented Nov. 23, 1965

3,219,610
COATING COMPOSITION COMPRISING A TERPOLYMER OF AN ALKYL ACRYLATE, AN ALKYL METHACRYLATE AND AN ESTER OF A $\beta,\gamma$-UNSATURATED ALCOHOL WITH METHACRYLIC ACID
Henry C. Tillson, 10 Dartmouth Road, Wilmington, Del.
No Drawing. Filed Aug. 10, 1961, Ser. No. 130,486
8 Claims. (Cl. 260—29.6)

This invention relates to latex coating compositions and to a process for their preparation.

Solutions of acrylic and methacrylic ester interpolymers in organic solvents have in the past been prepared for use in coating compositions. However, these compositions suffer all the drawbacks associated with organic solvent systems, i.e., toxic fumes, danger of fire, etc.

It has now been discovered that water-based latex coating compositions can be prepared by using as cross-linkable vehicles the unsaturated terpolymer latices resulting from the emulsion polymerization of alkyl acrylate with alkyl methacrylate and an ester of a $\beta,\gamma$-unsaturated alcohol with methacrylic acid which coalesce to relatively soft, acetone-soluble, continuous films that upon baking cross-link to hard, acetone-insoluble films.

Accordingly, the present invention relates to a coating composition comprising an aqueous dispersion of finely divided solid particles of an unsaturated terpolymer resulting from the emulsion polymerization of alkyl acrylate with alkyl methacrylate and an ester of a $\beta,\gamma$-unsaturated alcohol with methacrylic acid.

Before discussing the invention in greater detail, the following examples are presented for purposes of illustration, parts and percentages being by weight unless otherwise specified.

EXAMPLE 1

An unsaturated terpolymer latex was prepared by agitating the following materials under an atmosphere of nitrogen for 18 hours at a temperature of 5° C.:

| Materials: | Parts |
|---|---|
| Allyl methacrylate | 10 |
| Ethyl acrylate | 60 |
| Methyl methacrylate | 30 |
| Water | 200 |
| Polyoxyethylene lauryl ether (surface active agent) | 4.5 |
| p-Menthane hydroperoxide | 0.04 |
| Ferrous sulfate·7H$_2$O | 0.02 |
| Trisodium salt of ethylenediamine tetraacetic acid | 0.0294 |
| Sodium formaldehyde sulfoxylate·2H$_2$O | 0.036 |

The resulting latex was filtered through a 100-mesh screen and unreacted monomers stripped off by evaporation at a temperature of 50° C. under reduced pressure. The latex had a solids content of 46.5%, a pH of 3, and a particle size of approximately 0.09 micron. Monomer conversion to terpolymer was 96% of theory. Films of 5-mil thickness were prepared with a casting knife on 4″ x 8″ glass panels and air-dried at room temperature for 1 to 2 hours. The resulting films had a Sward rocker hardness of 12 and were soluble in acetone. Several of the coated panels were baked in a circulating air oven at a temperature of 150° C. for 30 minutes. The resulting films had a Sward rocker hardness of 20 and were insoluble in acetone.

EXAMPLE 2

An unsaturated terpolymer latex was prepared exactly as described in Example 1 except an amount of cobalt naphthenate drier equivalent to 0.1 part of cobalt was added. Films were prepared and air-dried as described in Example 1. The resulting films had a Sward rocker hardness of 14 and were soluble in acetone. When the films were baked at a temperature of 150° C. for 30 minutes they had a Sward rocker hardness of 31 and were insoluble in acetone.

EXAMPLE 3

An unsaturated terpolymer latex was prepared exactly as described in Example 1 except a nonyl phenoxy poly (ethyleneoxy) ethanol surface-active agent was substituted for the polyoxyethylene lauryl ether. Films were prepared and air-dried as described in Example 1. The resulting films had a Sward rocker hardness of 6 and were soluble in acetone. Several of the films were baked for 30 minutes at a temperature of 150° C., and several were baked for 30 minutes at a temperature of 200° C. Those baked at 150° C. had a Sward rocker hardness of 8 while those baked at 200° C. had a Sward rocker hardness of 20, but both sets were insoluble in acetone.

EXAMPLE 4

An unsaturated terpolymer latex was prepared by agitating the folowing materials under an atmosphere of nitrogen for 18 hours at a temperature of 5° C.:

| Materials: | Parts |
|---|---|
| Allyl methacrylate | 5.0 |
| Ethyl acrylate | 63.3 |
| Methyl methacrylate | 31.7 |
| Water | 200 |
| Polyoxyethylene lauryl ether (surface-active agent) | 4.5 |
| p-Menthane hydroperoxide | 0.04 |
| Ferrous sulfate·7H$_2$O | 0.02 |
| Trisodium salt of ethylenediamine tetraacetic acid | 0.0294 |
| Sodium formaldehyde sulfoxylate·2H$_2$O | 0.036 |

The resulting latex was worked up as described in Example 1. Monomer conversion to terpolymer was 96.4% of theory. Films were prepared and air-dried as described in Example 1. The resulting films had a Sward rocker hardness of 8 and were soluble in acetone. When the films were baked for 30 minutes at a temperature of 150° C., they had a Sward rocker hardness of 12 and were insoluble in acetone.

EXAMPLES 5 and 6

Two unsaturated terpolymer latices were prepared by agitating the following materials under an atmosphere of nitrogen for 18 hours at a temperature of 5° C.:

| Materials | Parts | |
|---|---|---|
| | Example 5 | Example 6 |
| Crotyl methacrylate | 10 | 2 |
| Ethyl acrylate | 60 | 65.3 |
| Methyl methacrylate | 30 | 32.7 |
| Water | 200 | 200 |
| Polyoxyethylene lauryl ether (surface-active agent) | 4.5 | 4.5 |
| p-Methane hydroperoxide | 0.04 | 0.04 |
| Ferrous sulfate·7H$_2$O | 0.02 | 0.02 |
| Trisodium salt of ethylenediamine tetraacetic acid | 0.0294 | 0.0294 |
| Sodium formaldehyde sulfoxylate·2H$_2$O | 0.036 | 0.036 |

The resulting latices were worked up as described in Example 1. The latex of Example 5 had a solids content of 36.8%, a pH of 3.5, and a particle size of approximately 0.1 micron, while the latex of Example 6 had a solids content of 40.0%, a pH of 3, and a particle size of approximately 0.1 micron. Monomer conversion to terpolymer was 90% in Example 5 and 94% in Example 6. Films of 5-mil thickness were prepared from each latex with a casting knife on 4″ x 8″ glass panels and air-dried at room temperature for 2 hours. The films prepared from the latex of Example 5 had a Sward rocker hardness of 1. The films prepared with the latex of Example 6 had a Sward rocker hardness of 2. Panels coated with the latices from Examples 5 and 6 were baked for 30 minutes at a temperature of 150° C. The baked films of both Examples 5 and 6 had a Sward rocker hardness of 8, a glossy appearance, and were insoluble in acetone.

EXAMPLE 7

An unsaturated terpolymer latex was prepared exactly as described in Example 5 except the dimethylethanolamine soap of hydrogenated rosin was substituted for the polyoxyethylene lauryl ether surface-active agent. Films were prepared and air-dried as described in Examples 5 and 6. The resulting films had a Sward rocker hardness of 2 and were soluble in acetone. After baking for 30 minutes at a temperature of 150° C., the films had a Sward rocker hardness of 10 and were insoluble in acetone.

EXAMPLE 8

An unsaturated terpolymer latex was prepared by agitating the following materials under an atmosphere of nitrogen for 15 minutes at a temperature of 50° C.:

| Materials: | Parts |
|---|---|
| Crotyl methacrylate | 8 |
| Ethyl acrylate | 61.3 |
| Methyl methacrylate | 30.7 |
| Water | 200.0 |
| Fatty alcohol sulfate (surface-active agent) | 4.0 |
| Ammonium persulfate | 1 |
| Sodium bisulfite | 0.5 |

The monomer conversion to terpolymer was 98% of theory. The resulting latex was worked up and films were prepared as described in Examples 5 and 6. The air-dried films were soluble in acetone while the films baked at a temperature of 150° C. for 30 minutes were insoluble in acetone.

EXAMPLE 9

A metal primer latex coating composition was prepared using as the vehicle the unsaturated terpolymer latex of Example 1. The following solid materials were ground to a fineness of 6 in the presence of water:

| Materials: | Parts |
|---|---|
| Ferric oxide | 72 |
| Aluminum silicate | 72 |
| Barium sulfate | 144 |
| Magnesium montmorillonite | 1 |
| Di-tertiary acetylenic glycol (20% in ethanol) | 1.6 |
| The sodium salt of carboxylated polyelectrolyte (as a surface-active agent) | 3.1 |
| Water | 107 |

To the above mixture was added:

| Materials: | Parts |
|---|---|
| Terpolymer latex (described in Example 1) | 627 |
| An alkyl aryl ether (surface-active agent) | 6.2 |
| Methyl cellulose, 15 cps. (5% in water) | 15.6 |
| Manganese dryer (5% manganese) | 6.2 |
| 28% aqueous ammonia | 0.3 |

The resulting formulation had a pigment volume concentration of 20%, a pigment-vehicle ratio of 50:50 by weight, a pH of 8.5, and a solids content of 55%.

This primer formulation was tested as an undercoating on steel panels (0.025″ thick) and compared with a commercial epoxy ester primer formulation. Each primer was sprayed on a steel panel with a suction spray gun and allowed to air-dry approximately 2 hours at room temperature. The panels coated with the unsaturated terpolymer latex formulation were baked for one hour at a temperature of 150° C. while the panels coated with the epoxy primer formulation were baked for 30 minutes at a temperature of 163° C. Each coating was dry sanded to a thickness of 1 mil and topcoated with either an amine resin modified alkyd or an acrylic lacquer. (Both of these are commercial automotive topcoating compositions.) All panels topcoated with the acrylic lacquer were first given a midcoat of a commercial primer surfacer approximately ¾ mil in thickness and allowed to air-dry. The modified alkyd topcoat was air-dried and then baked for 30 minutes at a temperature of 121° C. The acrylic lacquer topcoat was air-dried and then baked for 1 hour at a temperature of 107° C. Each topcoat was applied at approximately 2 mils dry thickness. Three panels of each type were prepared for testing in Florida, and three panels of each type were prepared for testing in Delaware. One set of panels of each type was scored vertically to determine the amount of corrosive creep; one set of panels of each type was dented on both the coated and uncoated sides with an impact flexibility tester weighing 4 lbs. and dropped from 4 feet; and one set of panels of each type was left undamaged. One group was exposed in Florida and the other in Delaware. All panels were set at an angle of 45° facing south in late summer where they remained for 5 months. The results of these tests are tabulated in Table I.

*Table I*

| | Unsaturated Terpolymer Latex Primer | | Epoxy Ester Primer | |
|---|---|---|---|---|
| | Alkyd Topcoat | Acrylic Topcoat | Alkyd Topcoat | Acrylic Topcoat |
| Florida exposure: | | | | |
| Concave dents— | | | | |
| Cracking [1] | 2(2) | 4(4) | 1(1) | 4(3) |
| Rusting [2] | 2 | 4 | 0 | 0 |
| Convex dents— | | | | |
| Cracking | 7(7) | 6(6) | 6(6) | 6(6) |
| Rusting | 7 | 6 | 6 | 3 |
| Creep, inches [3] | 1/32 | 0 | 1/32 | 0 |
| Delaware exposure: | | | | |
| Concave dents— | | | | |
| Cracking | 1(1) | 4(4) | 0(0) | 4(4) |
| Rusting | 1 | 0 | 0 | 0 |
| Convex dents— | | | | |
| Cracking | 5(5) | 7(7) | 5(4) | 8(7) |
| Rusting | 5 | 1 | 3 | 0 |
| Creep, inches | 1/16 | 1/16 | 1/8 | 1/8 |

[1] The number of cracks resulting from the denting. The number in parenthesis represents the number observable immediately after denting.
[2] The number of cracks which developed rust.
[3] Distance from score line exhibiting some failure, i.e., rusting, blistering, undercutting, etc.

It can be seen from the above comparison that an unsaturated terpolymer latex primer formulation can be substituted for a more expensive epoxy ester primer formulation without any material sacrifice in durability.

The unique latices utilized in this invention are prepared by a low-temperature emulsion polymerization of an alkyl acrylate with an alkyl methacrylate and an ester of $\beta,\gamma$-unsaturated alcohol with methacrylic acid. In order to avoid premature cross-linking through the unsaturated ester of methacrylic acid, the polymerization is preferably conducted at a temperature of from about $-15°$ C. to about 50° C.

Exemplary of the alkyl acrylates and methacrylates that can be used in the polymerization are those containing from 1 to 6 carbon atoms, in the alkyl group, such as methyl, ethyl, propyl, butyl, hexyl, etc. Exemplary of the esters of $\beta,\gamma$-unsaturated alcohols with methacrylic acid that can be used in the polymerization are allyl methacrylate, methallyl methacrylate, crotyl methacrylate, etc. The proportions or ratios of the monomers polymerized can vary over a wide range, the only limiting factor being the ability of the resulting unsaturated terpolymer latex to coalesce to a continuous film. This ability depends on such variables as the hardness of the terpolymer particles, the temperature during film drying, and the presence or absence of plasticizing agents. In general, however, the alkyl acrylate component of the terpolymer will be present in an amount of from about 40 to about 90 mole percent, the alkyl methacrylate in an amount of from about 5 to about 60 mole percent, and the unsaturated ester of methacrylic acid in an amount of from about 2 to about 30 mole percent. Most preferably, the mole ratio of alkyl acrylate to alkyl methacrylate will be approximately 2:1, but other ratios are quite suitable.

The emulsion polymerization of the monomers is conducted in the presence of a redox coupler and a surface-active agent. By the term "redox coupler" is meant a reduction-activated polymerization catalyst system. In general, the coupler will include a peroxide and an activator comprising a reducing agent. Exemplary of the redox couplers that can be used are the hydroperoxides such as p-menthane hydroperoxide, phenyl cyclohexane hydroperoxide, cumene hydroperoxide, diisopropylbenzene hydroperoxide, etc., activated by a ferrous ion complexed as the ethylenediamine tetraacetic acid salt and a reducing agent such as sodium formaldehyde sulfoxylate; or a persulfate such as ammonium persulfate, sodium persulfate, etc., activated by a reducing agent such as sodium bisulfite, potassium hydrosulfite, etc. Exemplary of the surface-active agents suitable to maintain dispersion of the reactants and products are the nonionic surface-active agents, as, for example, the condensation products of higher fatty alcohols with ethylene oxide, such as the reaction product of oleyl alcohol (9,10-octadecanol) with 10 ethylene oxide units; condensation products of alkylphenols with ethylene oxide, such as the reaction product of isooctylphenol with 12 ethylene oxide units; condensation products of higher fatty acid amides with 5, or more, ethylene oxide units; polyethylene glycol esters of long-chain fatty acids such as tetraethylene glycol monopalmitate, hexaethyleneglycol monolaurate, nonaethyleneglycol monostearate, nonaethyleneglycol dioleate, tricosaethylene glycol monobehenate, tricosaethyleneglycol dibehenate, ethylene oxide condensation products of polyhydric alcohol partial higher fatty acid esters, and their inner anhydrides (mannitol-anhydride, called Mannitan, and sorbitol - anhydride, called Sorbitan), such as glycerol monopalmitate reacted with 10 molecules of ethylene oxide, pentaerythritol monooleate reacted with 12 molecules of ethylene oxide, sorbitan monostearate reacted with 10 to 15 molecules of ethylene oxide, mannitan monopalmitate reacted with 10 to 15 molecules of ethylene oxide; long-chain polyglycols in which one hydroxyl group is esterified with a higher fatty acid and the other hydroxyl group is etherified with a low molecular alcohol, such as methoxypolyethylene glycol 550 monostearate (550 meaning the average molecular weight of the polyglycol ether). In addition to the nonionic surface-active agents, ionic agents such as sodium lauryl sulfate, alkali and amine soaps of fatty and rosin acids, etc., can be used alone or in combination with nonionics. The use of ionic surface-active agents is, of course, limited by the water sensitivity they impart to the coating compositions. Which surface-active agent is used and in what amount depends upon the specific composition of the latex and its intended use.

The solids content of the coating compositions of this invention will vary depending to a large extent on the particle size of the dispersed terpolymer. In general, the particle size will fall within the range of from about 0.01 micron to about 10 microns. Most preferably, the latex coating composition will be adjusted to a solids content of from about 40% to about 65% by weight and will contain at least about 30% by weight of terpolymer based on total solids. Obviously, the terpolymer can constitute essentially 100% of the total solids in situations where the coating composition is unpigmented.

The latex coating compositions of this invention can and often do contain other ingredients such as thickeners, stabilizers, dyes, pigments, driers, plasticizers, etc., but the presence or absence of such ingredients is immaterial to this invention. They can be used in all areas common to latex coatings and can be applied in any of the usual ways, i.e., brushing, rolling, dipping, or spraying (including airless spraying). Upon application they coalesce to continuous coatings which air-dry to relatively soft, acetone-soluble films. These films can then be baked to hard, durable, acetone-insoluble coatings. The baking process can be conducted in a number of ways and over a wide range of temperatures depending upon the specific terpolymer latex employed and its intended use. However, in general, the coating will be baked at a temperature of from about 150° C. to about 205° C. for a period of from about 20 minutes to about 60 minutes. Because of the unique properties of the coating compositions of this invention, they are particularly advantageous in preparing industrial coatings, both as primers and topcoats.

What I claim and desire to protect by Letters Patent is:

1. A latex coating composition comprising an aqueous dispersion of finely divided solid particles of an unsaturated terpolymer resulting from the emulsion polymerization of a monomer mixture consisting essentially of from about 40 to about 90 mole percent of an alkyl acrylate, from about 5 to about 60 mole percent of an alkyl methacrylate, and from about 2 to about 30 mole percent of an ester of a $\beta,\gamma$-ethylenically unsaturated monohydric alcohol with methacrylic acid.

2. The composition of claim 1 wherein the mole ratio of alkyl acrylate to alkyl methacrylate is about 2:1.

3. The composition of claim 1 wherein the alkyl acrylate is ethyl acrylate.

4. The composition of claim 1 wherein the alkyl methacrylate is methyl methacrylate.

5. The composition of claim 1 wherein the ester of the $\beta,\gamma$-ethylenically unsaturated monohydric alcohol with methacrylic acid is allyl methacrylate.

6. The composition of claim 1 wherein the ester of the $\beta,\gamma$-ethylenically unsaturated monohydric alcohol with methacrylic acid is crotyl methacrylate.

7. In the process of preparing a water-based latex coating composition, the improvement of using as an ingredient of said composition a cross-linkable unsaturated terpolymer latex resulting from the emulsion polymerization of a monomer mixture consisting essentially of from about 40 to about 90 mole percent of an alkyl acrylate, from about 5 to about 60 mole percent of an alkyl methacrylate, and from about 2 to about 30 mole percent of an ester of a $\beta,\gamma$-ethylenically unsaturated monohydric alcohol with methacrylic acid.

8. A latex coating composition comprising an aqueous dispersion of finely divided solid particles of an unsaturated terpolymer resulting from the emulsion polymerization of a monomer mixture consisting essentially of from about 40 to about 90 mole percent of ethyl acrylate, from about 5 to about 60 mole percent of methyl methacrylate, and from about 2 to about 30 mole percent of allyl methacrylate.

References Cited by the Examiner

UNITED STATES PATENTS

| 2,361,055 | 10/1944 | Pollack | 260—86.1 |
| 2,778,283 | 1/1957 | Bettoli et al. | 260—80.5 |
| 3,104,231 | 9/1963 | Fitch | 260—80.5 |

SAMUEL H. BLECH, *Primary Examiner.*

LEON J. BERCOVITZ, WILLIAM H. SHORT, MURRAY TILLMAN, *Examiners.*